United States Patent
Acharya et al.

(10) Patent No.: US 9,665,445 B1
(45) Date of Patent: May 30, 2017

(54) VIRTUAL PROXY BASED BACKUP

(71) Applicant: EMC IP Holding Company LLC, Hopkinton, MA (US)

(72) Inventors: Soumen Acharya, Bangalore (IN); Anupam Chakraborty, Bangalore (IN); Sunil Yadav, Bangalore (IN); Tushar Dethe, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 2 days.

(21) Appl. No.: 14/581,907

(22) Filed: Dec. 23, 2014

(51) Int. Cl.
*G06F 3/06* (2006.01)
*G06F 11/14* (2006.01)

(52) U.S. Cl.
CPC .......... *G06F 11/1464* (2013.01); *G06F 3/065* (2013.01); *G06F 3/0619* (2013.01); *G06F 3/0665* (2013.01); *G06F 11/1451* (2013.01)

(58) Field of Classification Search
CPC ...... G06F 11/1458; G06F 12/16; G06F 9/455; G06F 9/54; G06F 9/45533; G06F 3/067; G06F 2009/45583; G06F 3/0661; G06F 3/0604; G06F 9/45558; G06F 11/1464; G06F 11/1484; G06F 11/1451; G06F 2209/503; G06F 9/505; G06F 3/065
See application file for complete search history.

(56) References Cited

U.S. PATENT DOCUMENTS

| | | | | |
|---|---|---|---|---|
| 7,606,868 | B1* | 10/2009 | Le | G06F 17/30067 707/999.01 |
| 7,739,541 | B1* | 6/2010 | Rao | G06F 11/0709 709/205 |
| 8,296,419 | B1* | 10/2012 | Khanna | G06F 9/5072 709/201 |
| 8,566,542 | B1* | 10/2013 | Wang | G06F 11/1456 711/114 |
| 8,832,692 | B2* | 9/2014 | Fultheim | G06F 9/45533 718/1 |
| 8,856,319 | B1* | 10/2014 | Huang | G06F 9/5077 709/224 |
| 2003/0058277 | A1* | 3/2003 | Bowman-Amuah | G06F 17/30607 715/765 |
| 2007/0288247 | A1* | 12/2007 | Mackay | G06Q 10/00 705/1.1 |
| 2009/0216970 | A1* | 8/2009 | Basler | G06F 11/1456 711/162 |
| 2010/0262794 | A1* | 10/2010 | De Beer | G06F 9/45533 711/162 |
| 2011/0047195 | A1* | 2/2011 | Le | G06F 17/30091 707/827 |
| 2011/0066841 | A1* | 3/2011 | Goodrow | H04L 43/0894 713/150 |
| 2012/0150815 | A1* | 6/2012 | Pafumi | G06F 11/1658 707/679 |

(Continued)

*Primary Examiner* — Mano Padmanabhan
*Assistant Examiner* — Jean Edouard
(74) *Attorney, Agent, or Firm* — Van Pelt, Yi & James LLP

(57) ABSTRACT

Techniques for virtual proxy based backup of virtual machines in a cluster environment are disclosed. In some embodiments, each of a subset of virtual machines hosted by physical nodes in a cluster environment is configured as a virtual proxy dedicated to backup operations. During backup, data rollover of each virtual machine in the cluster environment that is subjected to backup is performed using a virtual proxy.

22 Claims, 2 Drawing Sheets

(56) References Cited

U.S. PATENT DOCUMENTS

| | | | | |
|---|---|---|---|---|
| 2012/0278287 A1* | 11/2012 | Wilk | ................... | G06F 11/1464 |
| | | | | 707/654 |
| 2012/0311572 A1* | 12/2012 | Falls | ...................... | G06F 9/455 |
| | | | | 718/1 |
| 2013/0232303 A1* | 9/2013 | Quan | ...................... | G06F 12/08 |
| | | | | 711/118 |
| 2013/0326175 A1* | 12/2013 | Tsirkin | ................ | G06F 9/45558 |
| | | | | 711/162 |
| 2014/0359612 A1* | 12/2014 | D'Amato | .............. | G06F 3/0626 |
| | | | | 718/1 |

* cited by examiner

VIRTUAL PROXY BASED BACKUP

BACKGROUND OF THE INVENTION

Traditionally, the backup of virtual machines hosted on physical nodes in a cluster environment is handled by the physical nodes themselves, for example, using Microsoft's Volume Shadow Copy Service (VSS). Thus, multiple physical nodes are typically employed for virtual machine backup in a cluster environment.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Techniques for virtual proxy based virtual machine backup in a cluster environment are disclosed. A virtual proxy comprises a virtual machine dedicated for backup operations in a cluster environment. Thus, in the disclosed virtual proxy based backup framework, data rollover (i.e., the operation in which application data is copied from a snapshot to a backup server or storage node) is offloaded from physical machines comprising the cluster and is instead delegated to one or more selected virtual machines that are configured as virtual proxies.

The disclosed techniques may be employed with respect to Microsoft Hyper-V CSV (Cluster Shared Volume) based applications. However, the disclosed techniques are not limited to Hyper-V CSV VM backup but may generally be employed for backing up virtual machines in a cluster environment comprising any platform and/or architecture.

Figure 1:
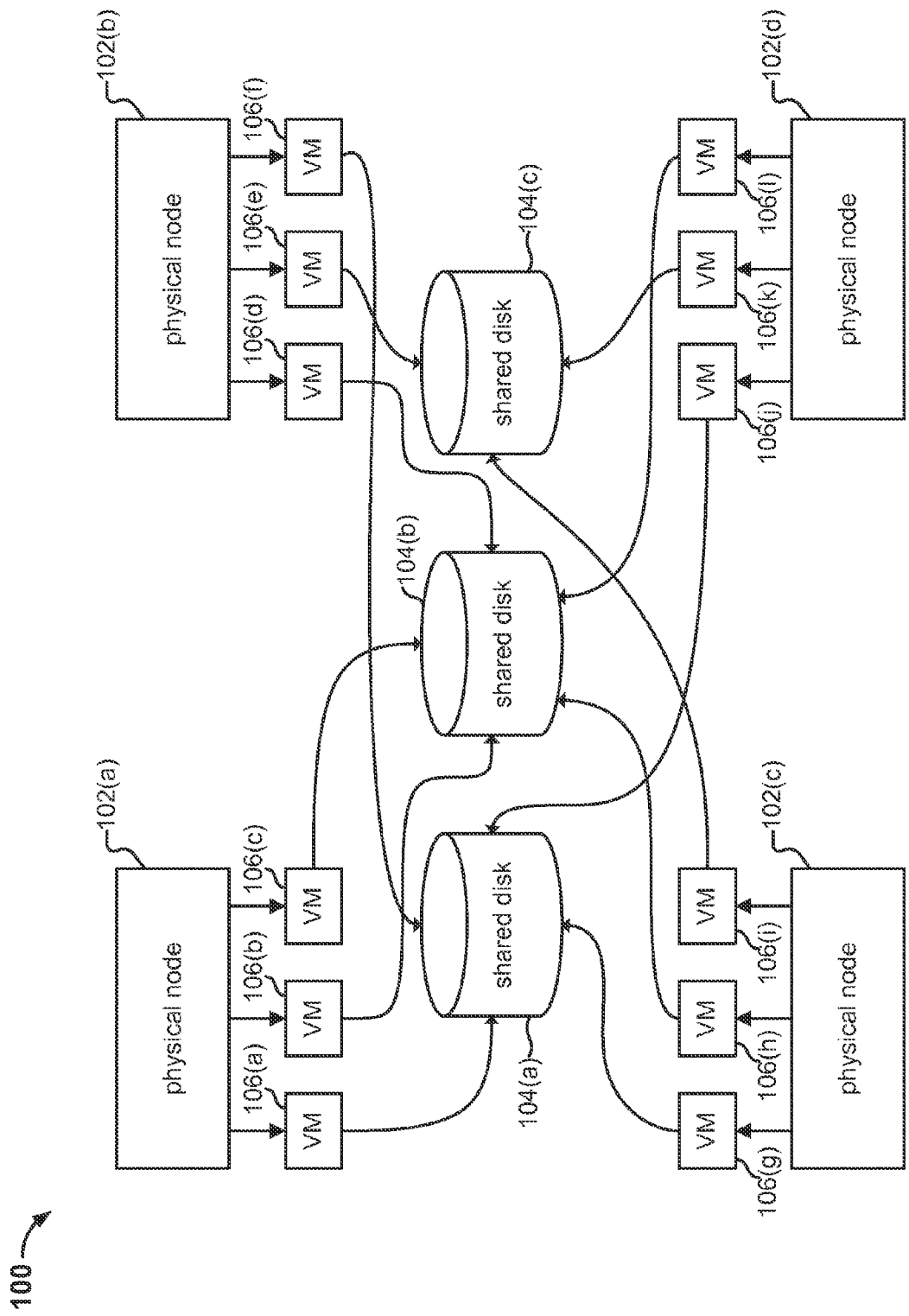
FIG. 1 is a high level block diagram illustrating an embodiment of a cluster environment.

FIG. 1 is a high level block diagram illustrating an embodiment of a cluster environment. In the given example, cluster environment 100 comprises four physical nodes 102(a)-(d), three shared disks 104(a)-(c), and twelve virtual machines 106(a)-(l). Each physical node 102 comprises at least one processor configured to execute instructions stored on and/or provided by a memory coupled to the processor.

In some embodiments, cluster 100 comprises a high-availability or failover cluster in which multiple physical machines 102 are grouped or clustered together for redundancy so that continued service is provided regardless of failures. For instance, in the event of a failure of a node in the cluster, any applications associated with the node remain uninterrupted as the applications are immediately and automatically migrated to another node in the cluster. One of physical nodes 102 of cluster 100 comprises a cluster owner node. A virtual cluster name associated with cluster 100 resolves to the cluster owner node. Any physical node 102 may be configured as cluster owner. Moreover, the cluster owner may be changed to another node of the cluster as desired.

Data associated with applications running on physical nodes 102 reside on shared disks 104. All shared disks 104 are accessible for read and write operations by all cluster nodes 102. Although accessible by any physical node 102, each shared disk 104 is directly connected (e.g., via a LAN) or localized to a particular physical node 102. Thus, more efficient (i.e., faster) communication is possible between a physical node and localized shared disk compared to between a physical node and shared disk that is not localized to that physical node. The localization of a shared disk 104 to a particular physical node 102 may be changed as desired.

In the given example, physical nodes 102 in cluster 100 host virtual machines 106. The data associated with each virtual machine 106 (e.g., associated virtual hard disks and configuration files) resides on a shared disk 104. For example, virtual machine 106(a) data is localized in shared disk 104(a), virtual machine 106(b) data is localized in shared disk 104(b), virtual machine 106(e) data is localized in shared disk 104(c), etc., as depicted in FIG. 1. Each virtual machine 106 has complete mobility throughout cluster 100 since any physical node 102 may access associated virtual hard disk files via the shared disk 104 on which the files reside. A shared disk 104 may store the data associated with a plurality of virtual machines 106 running on any of physical nodes 102.

In some embodiments, a virtual machine 106 comprises a Microsoft Hyper-V virtual machine. In some embodiments, a shared disk 104 comprises a Cluster Shared Volume (CSV), a feature of failover clustering available in Microsoft Windows Server 2008 R2 and Windows Server 2012. In other embodiments, any other virtual machine and/or shared disk platforms may be employed in cluster environment 100.

One or more virtual machines 106 of cluster 100 are selected and configured as virtual proxies. These virtual proxies are dedicated to assist with backup operations in the cluster environment. More specifically, data rollover is offloaded from the physical nodes of the cluster and instead delegated to these virtual proxies. Thus, virtual machine backup in cluster environment 100 is facilitated by virtual machines (i.e., virtual proxies). Any number of virtual machines 106 from any physical nodes 102 may be selected as virtual proxies using any appropriate selection algorithm. In some cases, the virtual machines to be configured as virtual proxies are selected or specified by a user or an administrator. The other virtual machines in the cluster that are not configured as virtual proxies are each assigned to a prescribed virtual proxy. During a backup operation, each virtual proxy facilitates data rollover of all assigned virtual machines. All virtual proxies operate in parallel. Thus, if improved (i.e., faster) backup performance is desired, more virtual machines of the cluster may be configured as virtual proxies so that a larger number of virtual machines are available to perform data rollover in parallel.

Figure 2:
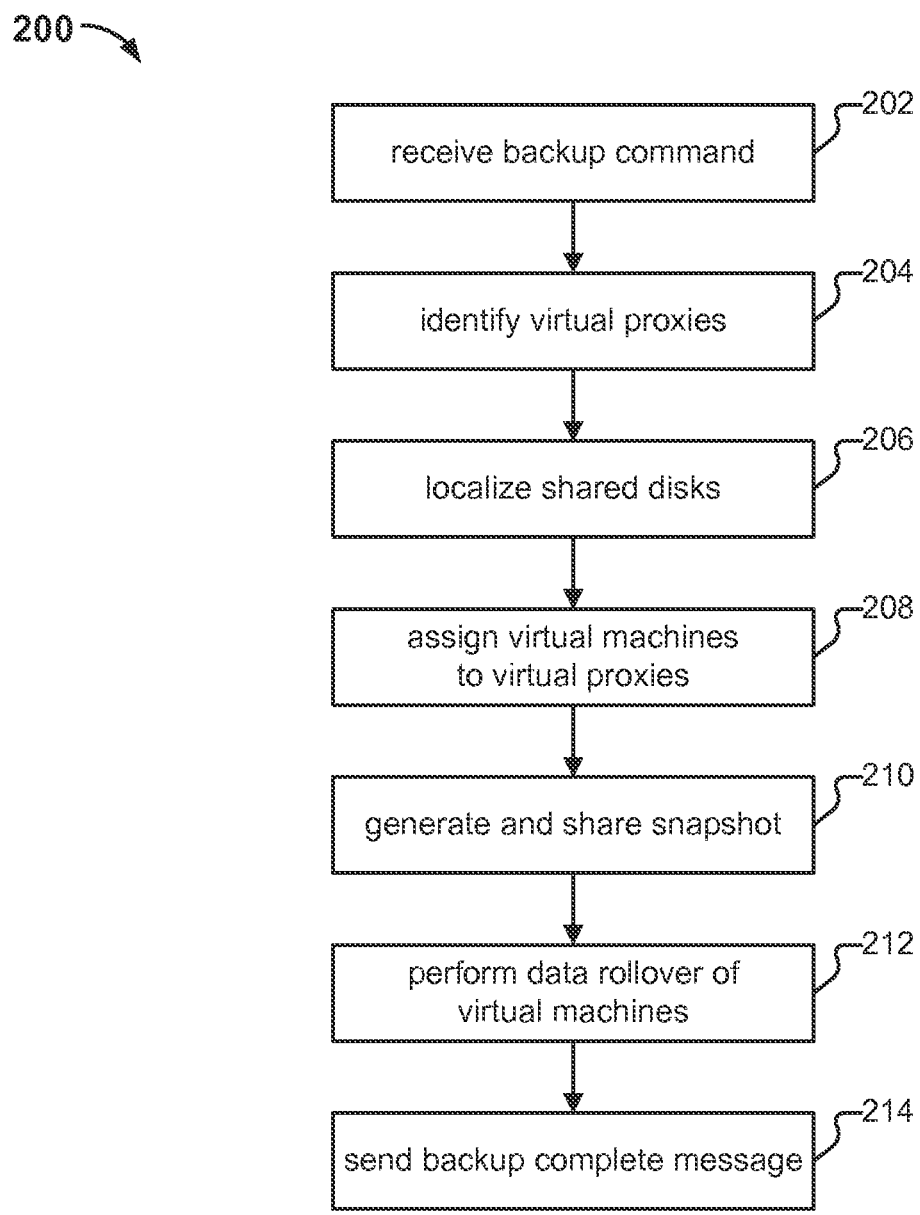
FIG. 2 is a flow chart illustrating an embodiment of a process for backing up virtual machines in a cluster environment.

FIG. 2 is a flow chart illustrating an embodiment of a process for backing up virtual machines in a cluster environment. Process 200, for example, may be executed in cluster environment 100 of FIG. 1. That is, the various steps of process 200 may be executed by appropriate components of cluster environment 100. In some embodiments, various steps of process 200 are at least in part facilitated by EMC Corporation's Networker Module for Microsoft (NMM), instances of which may be executed on one or more physical nodes of the cluster.

At step 202, a backup command is received from a backup server. The backup command is received by the cluster owner physical node. In some embodiments, a backup request is initiated by EMC Coporation's NetWorker server and/or received by EMC Corporation's Networker Module for Microsoft (NMM) application on the cluster owner node.

At step 204, virtual proxies in the cluster environment are identified. In some cases, step 204 may include selecting and configuring a subset of virtual machines in the cluster as virtual proxies.

At step 206, shared disks are localized as applicable. Step 206 includes identifying shared disks in the cluster that contain data of virtual machines that are subjected to be backed up via virtual proxy. Those identified shared disks that are not already localized to physical nodes on which virtual proxies are running are distributed and localized to physical nodes on which virtual proxies are running.

At step 208, a group or set of one or more virtual machines to be backed up is assigned to each virtual proxy. In some embodiments, a virtual machine stored on a shared disk that is localized to a physical node is assigned to a virtual proxy running on that physical node at step 208. In some such cases, the virtual proxy may also be stored on the same shared disk.

Any one or more appropriate algorithms may be employed to determine the shared disk to physical node and virtual machine to virtual proxy assignments at steps 206 and 208. In some embodiments, the assignments may be determined heuristically and/or on an ad hoc basis. Intelligently assigning shared disks to physical nodes and virtual machines to virtual proxies results in improved backup performance. For example, facilitating data transfer from localized shared disks during backup reduces or eliminates data hopping, which, in turn, reduces backup time. Likewise, load balancing virtual machines across virtual proxies increases parallel processing and, in turn, reduces backup time.

At step 210, a snapshot of the cluster, i.e., of all shared disks, is generated and shared. The snapshot may be taken by the cluster owner node or any other cluster node. Thus, only one physical node is employed in the backup operation and for the purpose of taking the snapshot. Virtual proxies are excluded from the snapshot since virtual proxies are not included in the backup. The snapshot is shared with physical nodes on which virtual proxies are running. In some cases, only portions of the snapshot corresponding to shared disks localized at a physical node are exposed to that physical node.

At step 212, data rollover is performed by each virtual proxy for each of the set of virtual machines assigned to it. The virtual proxies read data from the shared snapshot exposed to its physical host. Both shared disk localization and snapshot sharing aid in removing or at least reducing network hopping, thus improving backup speed. A data read during a rollover job by a virtual proxy uses its virtualization internal network, thus optimizing speed.

At step 214, a backup completion message is sent, e.g., to the backup server that initiated the backup request received at step 202. The backup completion message is sent after data rollover is finished for all virtual machines by the virtual proxies. In some embodiments, the cluster owner node operates as controller of the backup process and sends the backup completion message at step 214. In some such cases, an instance of NMM at the cluster owner node operates as controller of the backup process.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A backup method in a cluster environment, comprising:
configuring each of a first subset of virtual machines hosted by physical nodes in a cluster environment as a virtual proxy dedicated to backup operations;
assigning one or more of a second subset of the virtual machines hosted by the physical nodes in the cluster environment to the virtual proxy, wherein the one or more of the second subset of virtual machines are assigned to the virtual proxy based at least in part on a localization of the one or more of the second subset of the virtual machines in relation to the virtual proxy; and
performing data rollover during backup of each virtual machine in the cluster environment that is subjected to backup using a virtual proxy wherein the data rollover is performed on the one or more of the second subset of the virtual machines that are assigned to the virtual proxy.

2. The method of claim 1, wherein the cluster environment comprises one or more shared disks on which the virtual machines are localized.

3. The method claim 1, further comprising localizing a shared disk comprising the cluster environment to a physical node that hosts a virtual proxy.

4. The method claim 1, wherein the assigning of the one or more of the second subset to virtual machines to the virtual proxy comprises assigning backup of one or more virtual machines subjected to backup to the virtual proxy.

5. The method claim 1, wherein the assigning of the one or more of the second subset to virtual machines to the virtual proxy comprises assigning a virtual machine stored on a shared disk that is localized to a physical node to a virtual proxy running on that physical node.

6. The method claim 1, further comprising load balancing backup of virtual machines across a plurality of virtual proxies.

7. The method of claim 1, further comprising generating a snapshot of the cluster environment at a prescribed physical node and sharing the snapshot with other physical nodes that host virtual proxies.

8. A system, comprising:
- a physical node in a cluster environment that hosts a virtual machine, wherein the virtual machine is configured as a virtual proxy dedicated to backup operations; and
- a shared disk of the cluster environment shared by a plurality of physical nodes and localized to the physical node, wherein the shared disk stores data of a virtual machine in the cluster environment that is subjected to backup;
- wherein the virtual proxy hosted at the physical node is configured to facilitate data rollover during backup of the virtual machine stored on the shared disk that is subjected to backup,
- wherein the virtual proxy has assigned to it one or more virtual machines hosted by the physical node, wherein the one or more virtual machines assigned to the virtual proxy are assigned to the virtual proxy based at least in part on a localization of the one or more virtual machines in relation to the virtual proxy, and wherein the virtual machine that is subjected to backup is comprised in the one or more virtual machines assigned to the virtual proxy.

9. The system of claim 8, wherein the physical node hosts a plurality of virtual machines, a subset of which are configured as virtual proxies.

10. The system of claim 8, wherein the shared disk stores data from a plurality of virtual machines in the cluster environment that are subjected to backup.

11. The system of claim 10, wherein the virtual proxy is configured to facilitate data rollover during backup of a subset of the plurality of virtual machines stored on the shared disk that are subjected to backup.

12. The system of claim 8, wherein the physical node is configured to take a snapshot of the cluster environment or receive at least a portion of a shared snapshot taken by another physical node in the cluster environment.

13. The system of claim 8, wherein the virtual machine configured as the virtual proxy is stored on the shared disk.

14. A computer program product embodied in a non-transitory computer readable storage medium and comprising computer instructions for:

- facilitating configuration of a virtual machine hosted by a physical node in a cluster environment as a virtual proxy dedicated to backup operations;
- assigning one or more virtual machines hosted by the physical node in the cluster environment to the virtual proxy, wherein the one or more virtual machines are assigned to the virtual proxy based at least in part on a localization of the one or more virtual machines in relation to the virtual proxy;
- facilitating localizing a shared disk of the cluster environment shared by a plurality of physical nodes to the physical node, wherein the shared disk stores data of the one or more virtual machines that are assigned to the virtual proxy and that are subjected to backup; and
- delegating to the virtual proxy data rollover of the virtual machine subjected to backup that is stored on the shared disk.

15. The computer program product of claim 14, further comprising computer instructions for facilitating taking of a snapshot of the cluster environment by any one of the physical nodes comprising the cluster environment.

16. The computer program product of claim 14, further comprising computer instructions for facilitating sharing of a snapshot of the cluster environment among physical nodes comprising the cluster environment.

17. The computer program product of claim 14, wherein the computer program product comprises a controller of backup operations.

18. The computer program product of claim 14, wherein the computer program product is executed on the physical node.

19. The computer program product of claim 14, wherein the computer program product is executed on one of the plurality of physical nodes comprising the cluster environment.

20. The computer program product of claim 14, wherein the computer program product comprises EMC Corporation's Networker Module for Microsoft (NMM).

21. The method of claim 1, wherein data rollover comprises copying application data from a snapshot to a backup.

22. The method of claim 1, wherein each virtual proxy has a set of one or more virtual machines to be backed up assigned thereto.

* * * * *